US007837753B2

(12) United States Patent
Roundy et al.

(10) Patent No.: US 7,837,753 B2
(45) Date of Patent: Nov. 23, 2010

(54) SYSTEMS FOR FILTERING PARTICLES FROM AN AIRFLOW

(75) Inventors: James S. Roundy, Gilbert, AZ (US); Larry K. Ball, Chandler, AZ (US); Todd A. Kincheloe, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 396 days.

(21) Appl. No.: 11/948,474

(22) Filed: Nov. 30, 2007

(65) Prior Publication Data

US 2009/0139191 A1 Jun. 4, 2009

(51) Int. Cl.
*B01D 45/00* (2006.01)

(52) U.S. Cl. .......................... 55/385.3; 55/394; 55/418; 55/434; 55/462; 55/468; 55/DIG. 14

(58) Field of Classification Search .................. 55/306, 55/307, 396, 397, 440, 441, 385.1, 385.3, 55/394, 392, 434, 462, 468, DIG. 14, 418; 96/267; 60/39.092; 95/267; 244/53 B; 415/121.2
See application file for complete search history.

(56) References Cited

U.S. PATENT DOCUMENTS

| | | | | |
|---|---|---|---|---|
| 3,148,043 | A * | 9/1964 | Richardson et al. | 55/306 |
| 3,369,776 | A * | 2/1968 | Puryear | 244/53 B |
| 3,740,163 | A | 6/1973 | Schinnerer et al. | |
| 3,778,983 | A * | 12/1973 | Rygg | 55/306 |
| 3,979,903 | A * | 9/1976 | Hull et al. | 60/39.092 |
| 4,174,206 | A | 11/1979 | Dupre' et al. | |
| 4,291,530 | A * | 9/1981 | Ballard | 60/39.092 |
| 4,346,860 | A * | 8/1982 | Tedstone | 244/53 B |
| 4,389,227 | A * | 6/1983 | Hobbs | 55/306 |
| 4,469,497 | A | 9/1984 | Linhardt | |
| 4,591,312 | A * | 5/1986 | Wenglarz | 415/121.2 |
| 4,702,071 | A * | 10/1987 | Jenkins et al. | 60/39.092 |
| 4,749,387 | A | 6/1988 | Lotz | |
| 4,772,299 | A | 9/1988 | Bogusz | |
| 4,820,122 | A | 4/1989 | Hall et al. | |
| 5,131,807 | A | 7/1992 | Fischer et al. | |
| 5,339,622 | A * | 8/1994 | Bardey et al. | 60/39.092 |
| 5,549,721 | A | 8/1996 | Shchipachev | |
| 5,653,880 | A | 8/1997 | Mputon | |
| 6,491,734 | B1 | 12/2002 | Park | |
| 6,598,384 | B1 * | 7/2003 | Adkins | 60/39.092 |
| 6,818,034 | B2 | 11/2004 | Anderson | |
| 6,994,738 | B2 * | 2/2006 | Taddey et al. | 55/306 |

(Continued)

*Primary Examiner*—Duane Smith
*Assistant Examiner*—Minh-Chau Pham
(74) *Attorney, Agent, or Firm*—Ingrassia Fisher & Lorenz, P.C.

(57) ABSTRACT

Systems for filtering particles from an airflow are provided. In an embodiment, by way of example only, the system includes a chamber, an airflow and particle inlet, a concentrator, a first outlet, and a second outlet. The airflow and particle inlet is adapted to direct at least a portion of the airflow and the particles into the chamber. The concentrator is adapted to concentrate the particles from the airflow and particle inlet into a space within the chamber. The first outlet is in flow communication with the concentrator and adapted to allow the concentrated particles to exit the system, while minimizing an amount of air exiting therefrom. The second outlet is in flow communication with the chamber and is adapted to allow substantially all of the airflow to exit therethrough.

18 Claims, 4 Drawing Sheets

U.S. PATENT DOCUMENTS

| | | |
|---|---|---|
| 7,137,406 B2 | 11/2006 | Slawinski et al. |
| 7,147,684 B2 | 12/2006 | Anderson et al. |
| 7,153,346 B2 | 12/2006 | Ball et al. |
| 7,608,122 B2 * | 10/2009 | Snyder ........................ 55/306 |

* cited by examiner

SYSTEMS FOR FILTERING PARTICLES FROM AN AIRFLOW

TECHNICAL FIELD

The inventive subject matter generally relates to turbine engines, and more particularly relates to systems for filtering particles from an airflow of a turbine engine.

BACKGROUND

Gas turbine engines may be used to power aircraft and may include a fan section, a compressor section, a combustor section, a turbine section, and an exhaust section. The fan section is positioned at the front, or "inlet" section of the engine, and includes a fan that induces air from the surrounding environment into the engine. The fan section accelerates a fraction of the air toward the compressor section. The remaining fraction of air is accelerated into and through a bypass plenum, and out the exhaust section. The compressor section raises the pressure of the air it receives from the fan section to a relatively high level. The compressed air then enters the combustor section, where a ring of fuel nozzles injects a steady stream of fuel into the air. The injected fuel is ignited by a burner, which significantly increases the energy of the compressed air. The high-energy compressed air then flows into and through the turbine section, causing rotationally mounted turbine blades to rotate and generate energy. The air exiting the turbine section is exhausted from the engine via the exhaust section, and the energy remaining in this exhaust air aids the thrust generated by the air flowing through the bypass plenum.

Many gas turbine engines, such as the above-described turbofan gas turbine engine, selectively bleed air from the compressor section for the operation of aircraft systems that may be at least partially pneumatically operated. For example, the bleed air may be diverted to a starter control system that may include pneumatically-operated components, such as valves and/or regulators. At times, the bleed air may contain various particles, dirt, or other contaminants. To prevent or minimize particle buildup in the aircraft system, filters have been used upstream of the pneumatically-operated components. Conventionally, porous filters consisting of wire mesh or sintered powdered metal have been used within a flowpath of the bleed air. However, porous filters have limited life due to pore clogging. Additionally, porous filters may have mesh sizes that are larger than the size of some of the bleed air particles, and thus, may not be as effective as desired in filtering out these particles.

Accordingly, it is desirable to have an improved system for filtering particles from an airflow. In addition, it is desirable for the system to be capable of being retrofitted into currently existing engines or aircraft. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Systems for filtering particles from an airflow are provided.

In an embodiment, by way of example only, the system includes a chamber, an airflow and particle inlet, a concentrator, a first outlet, and a second outlet. The airflow and particle inlet is adapted to direct at least a portion of the airflow and the particles into the chamber. The concentrator is adapted to concentrate the particles from the airflow and particle inlet into a space within the chamber. The first outlet is in flow communication with the concentrator and adapted to allow the concentrated particles to exit the system. The second outlet is in flow communication with the chamber and is adapted to allow substantially all of the airflow to exit therethrough.

In another embodiment, by way of example only, a system includes a chamber, an inlet tube, a funnel, a first outlet, and a second outlet. The inlet tube has at least a portion extending into the chamber, and the inlet tube portion has a hole through which the airflow and the particles flow into the chamber. The funnel is aligned with the inlet tube hole to receive the particles therefrom. The first outlet is in flow communication with the funnel to provide an exit from the system for the particles. The second outlet is in flow communication with the chamber and is adapted to allow substantially all of the airflow to exit therethrough.

In still another embodiment, by way of example only, a system includes a chamber, a first outlet, and an outlet tube. The chamber has an inlet opening and a funnel, where the inlet opening is configured to allow the airflow and the particles to flow into the chamber, and the funnel is adapted to receive the particles from the inlet opening. The first outlet is in flow communication with the funnel to provide an exit for the particles from the system. The outlet tube is disposed at least partially within the chamber and has an inlet end and an outlet end. The inlet end has a shield and at least one aperture and is substantially aligned with the inlet opening and positioned on the inlet end to cause air from the airflow from the inlet opening to flow therearound and into the at least one aperture. The outlet end has a second outlet adapted to allow substantially all of the airflow to exit therethrough.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
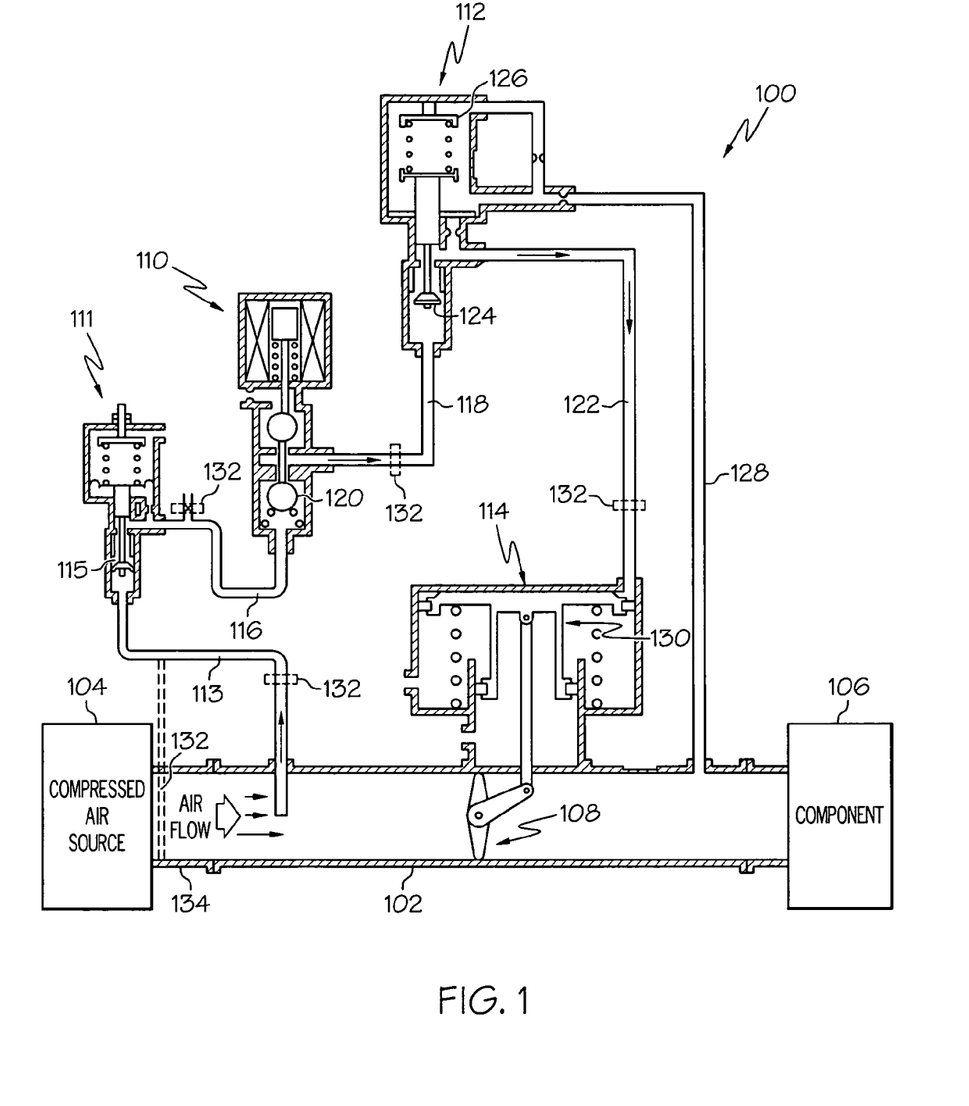
FIG. 1 is a simplified schematic of a pneumatic control valve system, according to an embodiment.

FIG. 1 is a simplified schematic of a pneumatic control valve system 100, according to an embodiment. The system 100 is configured to control airflow through a main duct 102 that connects a compressed air source 104 and a component 106. In an embodiment, the compressed air source may be air from an auxiliary power unit, bleed air from a compressor stage of a gas turbine engine, or a gas turbine ground power cart. The component 106 may be an air turbine starter, an environment control system, or any other pneumatically-operated engine component of an aircraft system.

Airflow is controlled through the main duct 102 via a valve 108. The valve 108 may be a butterfly valve, a poppet valve or any other valve capable of regulating the airflow through the main duct 102 by opening and closing in response to commands from one or more control components. In an embodiment, the valve 108 may be controlled by a solenoid 110 and by pneumatically-controlled components, such as a reference pressure regulator 111, a rate control servo 112 and/or an actuator 114. In other embodiments, the valve 108 may be controlled by additional components.

During operation of the system 100, a portion of the airflow from the main duct 102 may be diverted into the reference pressure regulator 111 by a reference pressure line 113. The reference pressure line 113 may be a duct, pipe, or other component for direction airflow to the reference pressure regulator 111 that extends from the main duct 102. In an embodiment, the reference pressure line 113 may receive air downstream from the compressed air source 104. In another embodiment, shown in phantom, the reference pressure line 113 may receive air from a location closer to the compressed air source 104. The reference pressure regulator 111 may be configured to respond to air pressure from the airflow so that if the air pressure is above a threshold value, a valve 115 closes to prevent air from flowing past the valve 115. In an embodiment, the threshold value may be between about 10 psi and about 400 psi. The valve 115 may be any type of valve capable of controlling air flow. If the air pressure is below the threshold valve, the airflow may then flow to a first line 116. In other embodiments, the system 100 may not include the reference pressure regulator 111 and may alternatively flow air directly to the first line 116. In any case, the first line 116 may be in flow communication with a second line 118, which may provide air to the rate control servo 112 and the actuator 114. The lines 116, 118 may be ducts, pipes, or other components for directing airflow. In an embodiment, airflow between the first and second lines 116, 118 may be controlled by the solenoid 110. In particular, the solenoid 110 may be configured to operate a valve mechanism 120 that is disposed between the first and second lines 116, 118, and adapted to control passage of air therebetween. Although the valve mechanism 120 is shown as a ball valve, any other type of valve capable of controlling airflow may alternatively be employed. When the solenoid 110 is energized via an energy source (not shown), it opens the valve mechanism 120 to allow the air to pass therethrough and to travel to the second line 118.

The second line 118 may be in flow communication with the actuator 114 via a third line 122. The third line 122 may be a duct, a pipe, or other component capable of directing airflow. To regulate a rate at which the airflow is provided to the actuator 114, the rate control servo 112 is disposed therebetween. In an embodiment, the rate control servo 112 responds to air pressure from the airflow so that if the air pressure is above a first threshold value, a valve 124 closes to prevent air from flowing to the actuator 114. In an embodiment, the threshold value may be between about 10 psi and about 50 psi. The valve 124 may be any type of valve capable of controlling air flow. The first threshold value of the rate control servo 112 may be controlled by a compensator 126. In any case, if the air pressure is below a second threshold value, it flows through the third line 122 to a piston 130. In an embodiment, the second threshold value may be between about 10 psi and about 30 psi and may or may not be equal to the first threshold value. In response to the air pressure, the piston 130 causes the actuator 114 to move and to thereby supply torque to the valve 108 in a desired direction and at a desired rate.

To increase a useful life of the system 100, one or more filtering systems 132 (shown in phantom) may be implemented therein. The filtering systems 132 may be configured to filter particles out of the airflow before it is used by one or more components of the pneumatic control valve system 100. In an embodiment, the filtering system 132 is configured to filter relatively large particles (e.g., particles having an average diameter larger than about 50 microns), while allowing smaller particles to flow through the system. In this regard, the filtering system 132 treats the large particles by gathering and concentrating the particles into a space and then directing them out of the system 132.

The filtering system 132 may be disposed at any one of numerous locations upstream of the actuator 114. In an embodiment, a filtering system 132 is disposed in communication with the main duct 102 upstream from the reference pressure regulator 111. For example, the filtering system 132 may be positioned upstream from the reference pressure line 113 (the embodiment of which is shown in phantom) or may be disposed in the reference pressure line 113. In another embodiment, a filtering system 132 may be positioned downstream from the reference pressure regulator 111, but upstream from the solenoid 110. In this regard, the filtering system 132 may be positioned in another duct 134 upstream from the main duct 102, may be disposed in the reference pressure line 113 downstream of the reference pressure regulator 111, or may be disposed in the first line 116. In another embodiment, a filtering system 132 is disposed in the second line 118 between the solenoid 110 and the rate control servo 112. In still another embodiment, the filtering system 132 may be disposed in the third line 122 between the rate control servo 112 and the actuator 114.

Figure 2:
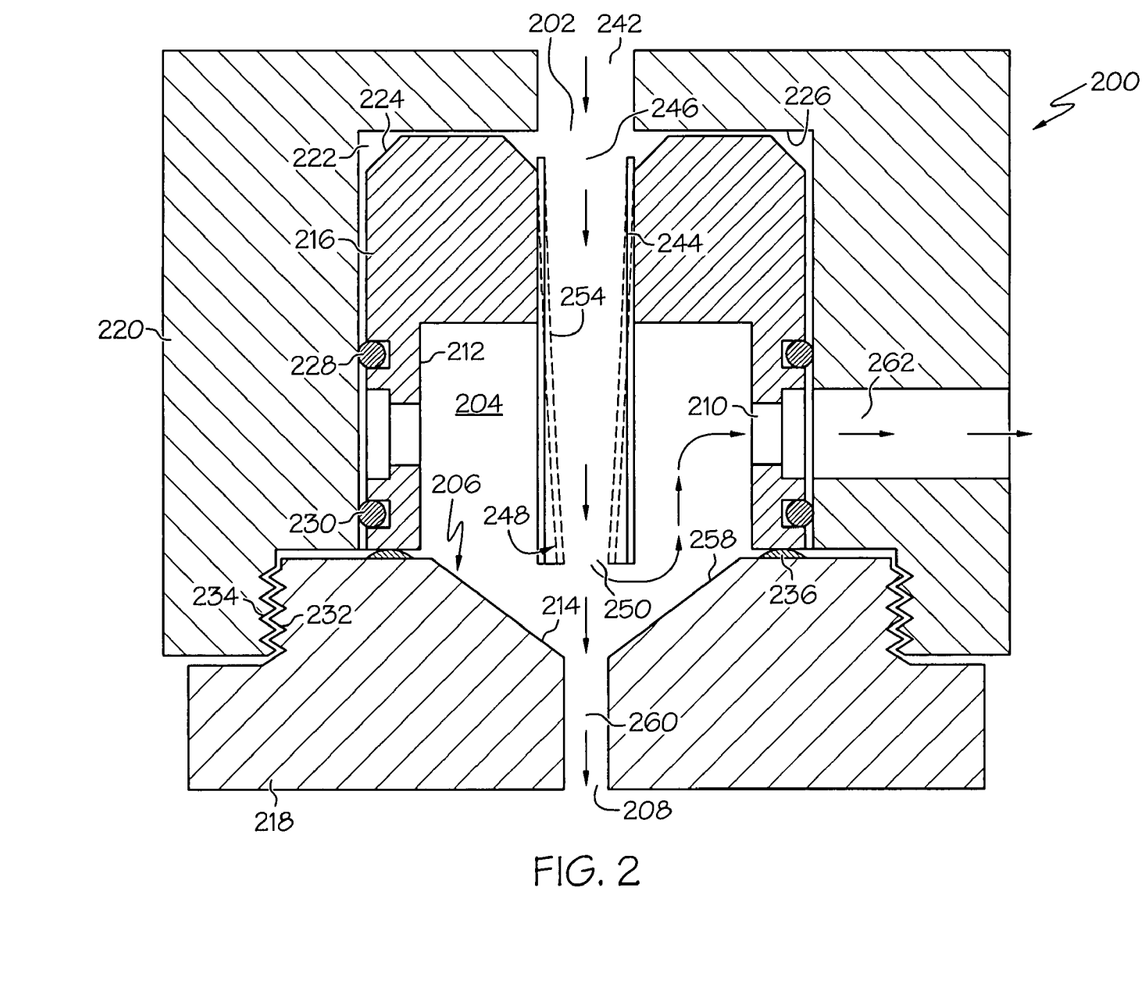
FIG. 2 is a simplified cross-sectional view of a filtering system, according to an embodiment.

FIG. 2 is a cross-sectional view of a filtering system 200, according to an embodiment. The filtering system 200 may be a fitting formed from a single, integral piece, or may be an assembly made of multiple pieces (as shown in FIG. 2). In an embodiment, the filtering system 200 may be adapted to be implemented between two or more ducts or pipes. In another embodiment, the filtering system 200 may be disposed in a duct or pipe.

The filtering system 200 may include a chamber 204, an airflow and particle inlet 202, a concentrator 206, a first outlet 208, and a second outlet 210. The chamber 204 may be defined at least partially by inner surfaces 212, 214 of housings 216, 218, 220 made of steel, aluminum, or other conventional aircraft component material. In an embodiment, three housings (e.g., a first housing 216, a second housing 218, and an outer housing 220) may make up the chamber 204. For example, in one configuration, the outer housing 220 may have walls 226 that define a cavity 222 within which the first housing 216 may be disposed. The first housing 216 may have an outer surface 224 that may or may not contact the cavity walls 226. The second housing 218 may be coupled to the outer housing 220 to partially enclose the cavity 222. In other embodiments, more or fewer housings may be employed to make up the chamber 204. In still other embodiments, the chamber 204 may be formed from a single piece. Moreover, although each housing is shown as a separate component, any may alternatively be part of an already-existing, larger component. For example, the second housing 218 may be part of a portion of a bleed assembly (not shown), such as a duct including a bleed orifice.

To prevent unwanted air leakage, o-ring seals 228, 230 may be disposed between the first housing 216 and the outer housing 220, in an embodiment. Although two o-ring seals 228, 230 are shown, fewer or more may alternatively be included. In another embodiment, the second housing 218 and the outer 
housing 220 may be coupled together via threading 232, 234. In other embodiments, the second housing 218 and the outer housing 220 may be adhered to each other with an adhesive to form a leak-tight seal therebetween. In any case, a shim or spring 236 may be disposed between the first and the second housings 216, 218 so that each may be appropriately positioned relative to the outer housing 220.

The airflow and particle inlet 202 is adapted to receive air from the compressed air source 104 (FIG. 1) and to direct at least a portion of the air and any particles that may be carried therewith, into the chamber 204. In this regard, the airflow and particle inlet 202 may have any one of numerous embodiments suitable for receiving and directing air. For example, the airflow and particle inlet 202 may include an opening 242 into the chamber 204. In an embodiment, the opening 242 may be formed in the outer housing 220 and may have a circular, ovular, rectangular, or other suitable cross-sectional flow area shape. In another embodiment, the airflow and particle inlet 202 may be adapted to direct the airflow and particles into a middle of the chamber 204 and may include, in addition to the opening 242, an inlet tube 244 that has a portion that extends into the chamber 204.

As shown in FIG. 2, the inlet tube 244 may be a separate piece from the first housing 216 and may be press fit, brazed, or otherwise attached thereto. In other embodiments, the inlet tube 244 may be integrally formed as part of the first housing 216 or outer housing 220. In any case, the inlet tube 244 may be made of steel, aluminum, or another material, and may or may not be made of the same material as other surround components (e.g., any of the housings 216, 218, or 220). In an embodiment, the inlet tube 244 may be relatively thin-walled, having walls with a thickness of between about 0.5 mm and about 1.0 mm. Alternatively, the walls may be thicker or thinner, in other embodiments. Although the inlet tube 244 is shown as being straight in FIG. 2, it may have another configuration in other embodiments. For example, the inlet tube 244 may be spiral, curved, or have one or more bends therein.

No matter the particular configuration, the inlet tube 244 includes an inlet end hole 246 and an outlet end hole 250. The inlet end hole 246 is disposed such that substantially all of the air from the opening 242 enters the hole 246. In an embodiment, the inlet end hole 246 may be disposed flush with the opening 242. In another embodiment, the two may be spaced a distance apart from each other. For example, the inlet end hole 246 and opening 242 may be between about 5 and about 50 mm apart from each other. The inlet end hole 246 may have a diameter that is substantially equal to that of the opening 242. In an embodiment, the diameter of the inlet end hole 246 may be between about 5 mm and about 10 mm. In other embodiments, the diameter of the inlet end hole 246 may be larger or smaller than the opening 242. The outlet end hole 250 is configured to allow the airflow and the particles to flow from the inlet tube 244 into the chamber 204.

The airflow and particle inlet 202 may include a particle accelerator 248 (shown in phantom). The particle accelerator 248 may be adapted to accelerate the speed of the particles (and the air that carries the particles) as it travels through the airflow and particle inlet 202 into the chamber 204 to increase the momentum of the particles. In an embodiment, the particle accelerator 248 may be adapted to increase the speed of the particles by about 40 m/s. In another embodiment, the particles may be accelerated to a speed of about 120 m/s.

The particle accelerator 248 may be formed as part of the inlet tube 244, in an embodiment. For example, the inlet tube 244 may have a decreasing cross-sectional flow area along its length so that the diameter of the outlet end hole 250 is smaller than the inlet end hole 246. In an embodiment, the outlet end hole 250 may have a diameter of between about 6.0 mm and about 15.0 mm, while the inlet end hole 246 may have a diameter of between about 10.0 mm and about 15.0 mm. In another embodiment, the outlet end hole 250 may be between about 0.5 and about 1.0 times smaller than the inlet end hole 246. In an example, in a configuration in which the inlet tube 244 is straight, the tube 244 may have an inner surface 254 that is tapered to form a nozzle. In other embodiments, the particle accelerator 248 may be a separate component that is attached to or otherwise extends from a component of the airflow and particle inlet 202, such as the inlet tube 244.

The accelerated particles and air may be directed into the concentrator 206 and the second outlet 210, respectively. The concentrator 206 is adapted to concentrate at least a portion of the particles from the airflow and particle inlet 202 into a space within the chamber 204 and thus, may be disposed to receive the particles from the airflow and particle inlet 202. To enhance operation, the concentrator 206 and the airflow and particle inlet 202 may be disposed such that gravitational forces aid the particles in dropping into the concentrator 206. In an embodiment, the concentrator 206 may be disposed to receive accelerated particles having a momentum that prevents the particles from following the airflow around the inlet tube 244 in order to return to the chamber 204 or to flow to the second outlet 210.

In an embodiment, the concentrator 206 may be adapted to funnel the particles into the chamber space. In this regard, the concentrator 206 may include a funnel 258 or have a funnel-shaped surface. The funnel 258 may be aligned to receive particles from the airflow and particle inlet 202 and may have an inlet diameter that is greater than an outlet diameter. In an embodiment, the inlet diameter may be between about 10.0 mm and about 20.0 mm, while the outlet diameter may be between about 0.5 mm and about 1.0 mm. In another embodiment, the inlet diameter may be about 10 times larger than the outlet diameter. Additionally, the outlet diameter may be appropriately sized to ensure that particularly-sized particles may be expelled from the system 200. The funnel 258 may be made up of a funnel-shaped portion of the inner surface 214 of the second housing 218, in an embodiment. In another embodiment, the funnel 258 may be a separate piece that is disposed within the chamber 204.

The particles collected by the concentrator 206 may be diverted into the first outlet 208. The first outlet 208 is disposed in flow communication with the concentrator 206 and adapted to provide an exit for the particles from the filtering system 200. In an embodiment, the first outlet 208 may include a portion having a diameter that is suitable for receiving the particles, but also for minimizing an amount of air from escaping therefrom. In some embodiments, the diameter of the first outlet 208 may be substantially equal to the outlet diameter of the funnel 258. In other embodiments, the diameter of the first outlet 208 may be larger or smaller than the outlet diameter of the funnel 258. In an example, the first outlet 208 may have a diameter of between about 0.5 mm and about 1.0 mm. The diameter may be larger or smaller in other embodiments and may depend on the size and shapes of the particles desired to be expelled.

The first outlet 208 may be an opening formed through the second housing 218. In an embodiment, as mentioned above, the second housing 218 may be part of a bleed assembly, such as a component having a bleed orifice (also known as an honest orifice). In such case, the opening making up the first outlet 208 may be the bleed orifice. In another embodiment, the opening may be formed as part of a channel 260 extending through the second housing 218 from the funnel 258. The channel 260, if included, may have a uniform diameter along its length, or may have a varying diameter. For example, the diameter of the channel 260 may be between about 0.5 mm and about 10.0 mm.

Figure 3:
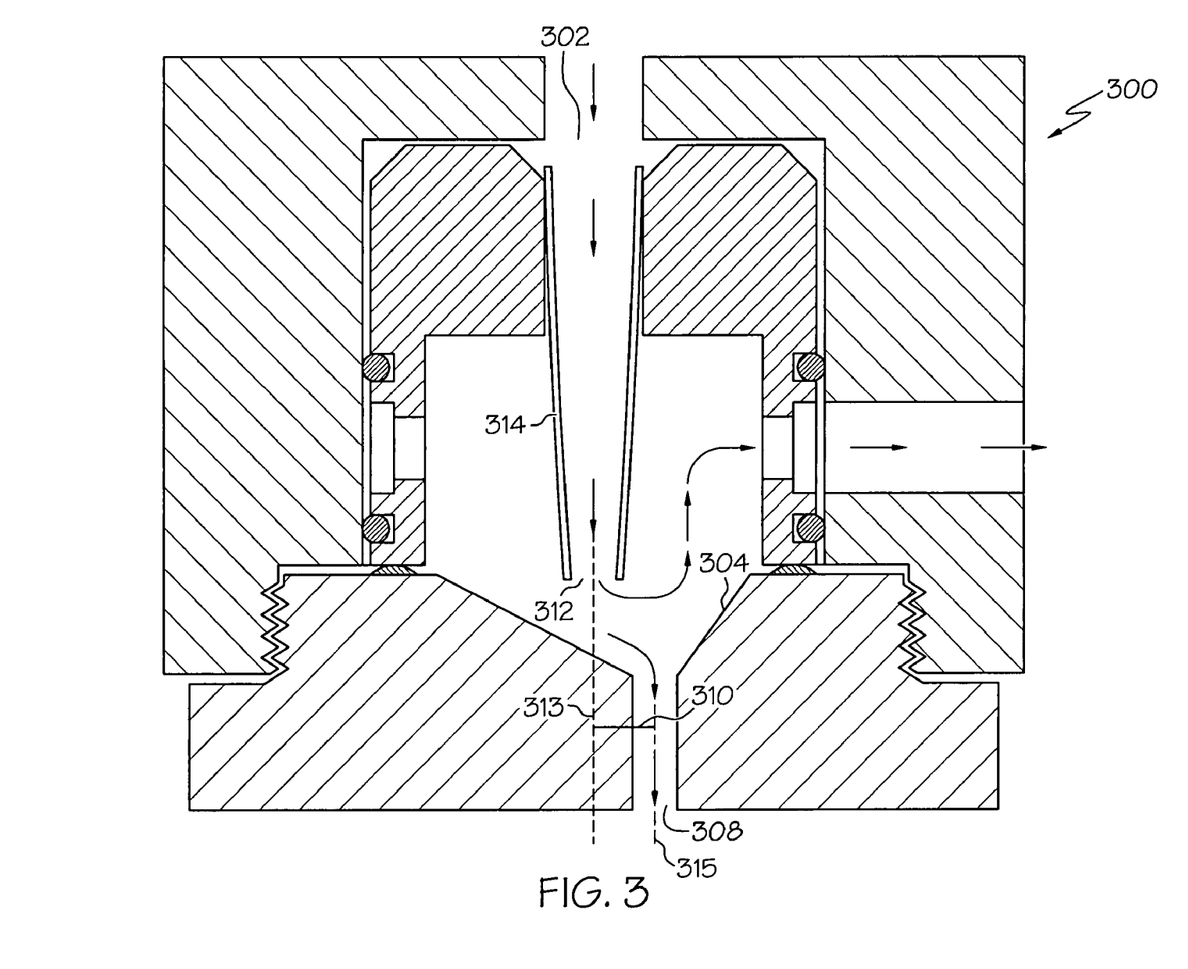
FIG. 3 is a simplified cross-sectional view of a filtering system, according to another embodiment.

The first outlet 208 may be substantially aligned with the airflow and particle inlet 202. In one example, the first outlet 208 is substantially aligned with the outlet end hole 250 of the inlet tube 244. In another embodiment, as shown in FIG. 3, which depicts another embodiment of the system 300, the first outlet 308 may not be aligned with the airflow and particle inlet 302. For example, the first outlet 308 may be adapted to receive particles from a funnel 304 that communicates with an outlet end hole 312 of a tapered inlet tube 314, but may a center axis 313 of the first outlet 308 may be offset from a center axis 315 of the airflow and particle inlet 302 by a distance 310 of between about 4.0 mm and about 10.0 mm. In other embodiments, the offset distance 310 may be greater or smaller.

Returning to FIG. 2, as briefly mentioned above, the second outlet 210 is in flow communication with the chamber 204 and is adapted to allow substantially all of the airflow to exit through the second outlet 210 with minimal particles flowing therethrough. In this regard, the second outlet 210 may be disposed in a particular portion of the chamber 204 and/or may have a particular configuration. In an embodiment, in order to ensure that a majority of the particles desired to be filtered do not travel into the second outlet 210, the second outlet 210 may be positioned such that air from the airflow and particles inlet 202 or outlet end hole 250 of the inlet tube 244 makes about a 180 degree turn into a flowpath leading to the second outlet 210. For example, the second outlet 210 may be positioned in a section of the chamber 204 that may not be aligned with the airflow and particle inlet 202. In another example, the second outlet 210 may be disposed between the airflow and particle inlet 202 and the concentrator 206. In still another example, the second outlet 210 may be disposed at a position between the airflow and particle inlet 202 and the funnel 258. In still yet another example, the second outlet 210 may be positioned between the outlet end hole 250 and the funnel 258.

The second outlet 210 may include an outlet port 262, in an embodiment. The outlet port 262 may be formed through the outer housing 220 and/or the first housing 216 and may have a length. In any case, to ensure that the airflow preferentially exits the system 200 via the second outlet 210, rather than through the first outlet 208, at least a portion of the second outlet 210 (such as a portion of the outlet port 262) may have a diameter that is greater than that of the first outlet 208. In an embodiment, the diameter of the second outlet 210 may be between about twenty (20) to twenty-five (25) times larger than the diameter of the first outlet 208. For example, if the first outlet 208 has a diameter of between about 0.5 mm and about 1.0 mm, the second outlet 210 may have a diameter of between about 5.0 mm and about 20.0 mm.

Thus, by concentrating particles of a particular size into a space, either by accelerating the particles toward the space with the particle accelerator 248 or by using gravitational forces to act on the particles through the use of the funnel 258, the particles may be gathered to thereby be directed out of the system 200. Moreover, as mentioned above, with the second outlet 210 having a diameter that is sized larger than that of the first outlet 208 and, in some embodiments, the first outlet 308 not being aligned with the airflow and particle inlet 302, a minimal amount of air escapes with the particles through the first outlet 208, 308. Instead, the airflow preferentially exits via the second outlet 210.

Figure 4:
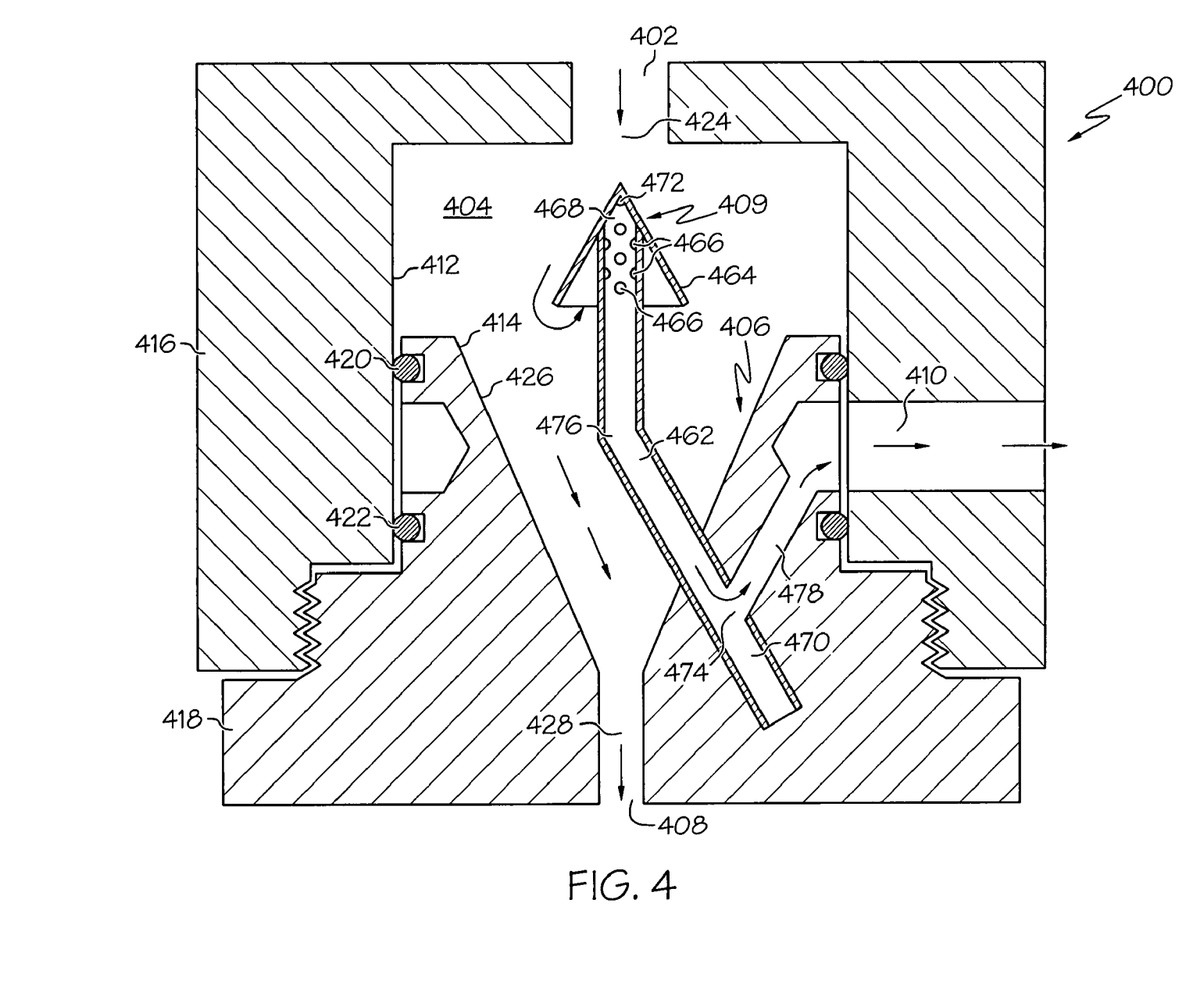
FIG. 4 is a simplified cross-sectional view of a filtering system, according to still another embodiment.

FIG. 4 is a cross-sectional view of another filtering system 400 that may be used to filter particles from an airflow, according to another embodiment. In this embodiment, the filtering system 400 may be a fitting formed from a single, integral piece, or may be an assembly made of multiple pieces (as shown in FIG. 4). In an embodiment, the filtering system 400 may be adapted to be implemented between two ducts or pipes. In another embodiment, the filtering system 400 may be disposed in a duct or pipe.

The filtering system 400 may include a chamber 404, an airflow and particle inlet 402, a concentrator 406, a first outlet 408, a particle separator 409, and a second outlet 410. In an embodiment, the chamber 404 may be defined at least partially by inner surfaces 412, 414 of housings 416, 418 made of steel, aluminum, or other conventional aircraft component materials. In an embodiment, two housing 416, 418 make up the chamber 404. In this regard, the inner surface 412 of a first housing 416 may define a portion of the chamber 404, while the inner surface 414 of a second housing 418 may define another portion of the chamber 404. The first and second housings 416, 418 may be attached to each other to partially enclose the chamber 404. Although two housings 416, 418 are shown in FIG. 4, more or fewer may alternatively be included. For example, the chamber 404 may be formed in an integral piece. Moreover, although each housing is shown as a separate component, any may alternatively be part of an already-existing, larger component. For example, the second housing 418 may be part of a portion of a bleed assembly (not shown), such as a duct including a bleed orifice.

To prevent unwanted air leakage, o-ring seals 420, 422 may be disposed between the first housing 416 and the second housing 418. Although two o-ring seals 420, 422 are shown, fewer or more may alternatively be included. In other embodiments, the housings 416, 418 may be adhered to each other with adhesive to form a leak-tight seal therebetween.

The airflow and particle inlet 402 is adapted to receive air from the compressed air source 104 (FIG. 1) and to direct at least a portion of the airflow and any particles that may be carried therewith, into the chamber 404. In an embodiment, the airflow and particle inlet 402 may include an opening 424 into the chamber 404. The opening 424 may be formed in the first housing 416, in an embodiment, and may have a circular, ovular, rectangular, or other suitable cross-sectional flow area shape. In an embodiment, the opening 424 may have a diameter that is between about 5.0 mm and about 10.0 mm. In other embodiments, the opening 424 may be larger or smaller. Although not shown in FIG. 4, in another embodiment, the airflow and particle inlet 402 may include, in addition or in an alternative to the opening 424, an inlet tube that extends into the chamber 404, which may or may not be integrally formed as part of the first housing 416.

The particles and air from the airflow and particle inlet 402 are directed toward the concentrator 406, the first outlet 408, the particle separator 409, and the second outlet 410. The concentrator 406 is adapted to concentrate the particles from the airflow and particle inlet 402 into a space within the chamber 404 and thus, may be disposed to receive the particles from the airflow and particle inlet 402. In an embodiment, the concentrator 406 and the airflow and particle inlet 402 may be disposed such that gravitational forces aid the particles in dropping into the concentrator 406.

In an embodiment, the concentrator 406 may be adapted to funnel the particles into the chamber space. For example, the concentrator 406 may include a funnel 426 or funnel-shaped surface. The funnel 426 may be aligned to receive particles from the airflow and particle inlet 402 and may be made up of a funnel-shaped portion of the inner surface 414 of the second 
housing 418, in an embodiment. In another embodiment, the funnel 426 may be a separate piece that is placed in a desired portion of the chamber 404. In any case, the funnel 426 may have an inlet diameter that is greater than an outlet diameter. Additionally, the outlet diameter may be appropriately sized to ensure that particularly-sized particles may be expelled from the system 400. The inlet diameter may be between about 25.0 mm and about 50.0 mm, while the outlet diameter may be between about 0.5 and about 1.0 mm. In another embodiment, the inlet diameter may be about twenty-five (25) times larger than the outlet diameter.

The particles collected by the concentrator 406 may be diverted into the first outlet 408. The first outlet 408 is disposed in flow communication with the concentrator 406 and adapted to allow the concentrated particles to exit the filtering system 400. In an embodiment, the first outlet 408 may include a portion having a diameter that is suitable for receiving the particles, but also for minimizing an amount of air from escaping therefrom. In some embodiments, the diameter of the first outlet 408 may be substantially equal to the outlet diameter of the funnel 426. In other embodiments, the diameter of the first outlet 408 may be larger or smaller than the outlet diameter of the funnel 426. In an example, the first outlet 408 may have a diameter of between about 0.5 mm and about 2.0 mm. The diameter may be larger or smaller in other embodiments and may depend on the size and shapes of the particles desired to be expelled.

The first outlet 408 may be an opening formed through the second housing 418. In an embodiment, as mentioned above, the second housing 418 may be part of a bleed assembly, such as a component having a bleed orifice (also known as an honest orifice). In such case, the opening making up the first outlet 408 may be the bleed orifice. In another embodiment, the opening may formed as part of a channel 428 extending through the second housing 418 from the funnel 426. The channel 428, if included, may have a uniform diameter along its length, or may have a varying diameter. For example, the diameter of the channel 428 may be between about 0.5 mm and about 1.0 mm.

The first outlet 408 may be substantially aligned with the airflow and particle inlet 402. In one example, the first outlet 408 may not be aligned with the airflow and particle inlet 402.

Before the particles enter the concentrator 406, they may be separated from the airflow by a particle separator 409. The particle separator 409 is adapted to allow the particles to flow therearound, and to allow the air to flow therethrough. In an embodiment, the particle separator 409 may include an outlet tube 462, a shield 464, and at least one aperture 466. The outlet tube 462 may extend at least partially into the chamber 404 from the second housing 418 and may be made of steel, aluminum, or another material, and may be relatively thin-walled. For example, the outlet tube 462 may have walls with a thickness of between about 0.4 mm and about 1.0 mm. Although outlet tube 462 is shown as having a single bend 476 in other embodiments, the outlet tube 462 alternatively have more than one bend. In still other embodiments, the outlet tube 462 may be spiral-shaped, or may be straight.

In an embodiment, the outlet tube 462 includes an inlet end 468 and an outlet end 470. The inlet end 468 may be substantially aligned with the airflow and particle inlet 402 and may include the shield 464 and the apertures 466 thereon. In an embodiment, the shield 464 may be formed of steel, aluminum, plastic, or any other material conventionally used for aircraft components. The shield 464 may have a flange 472 that is inserted into an opening (not shown) formed on the inlet end 468. The flange 472 may be press fit, brazed, or otherwise attached to the inlet end 468. In any case, the shield 464 may be configured to allow air to flow around the outlet tube 462. In this regard, the shield 464 may have at least one flat surface that is substantially in alignment with the airflow and particle inlet 402. The flat surface may be substantially perpendicular to the airflow from the airflow and particle inlet 402. In another embodiment, the flat surface may make up part of a V-shaped component. In an alternative embodiment, the shield 464 may have a curved surface. In another embodiment, the shield 464 may be configured to surround at least a portion of the inlet end 468 around at least a portion of the apertures 466. For example, the shield 464 may extend between about 2.0 mm and about 10.0 mm past the apertures 466.

The apertures 466 receive the air that flows around the shield 464. Although seven apertures are shown in FIG. 4, more or fewer may alternatively be employed in other embodiments. The apertures 466 may each have a diameter that is between about 0.4 mm and about 1.0 mm. In an embodiment, the apertures 466 may collectively have a flow area that is larger than a flow area of the first outlet 406. For example, the apertures 466 may have a flow area that is between about 1 to about 1.5 times larger than the flow area of the first outlet 406.

The outlet end 470 of the outlet tube 462 is attached to the second housing 418. In an embodiment, the outlet end 470 may be integrally formed as part of the second housing 418. In another embodiment, the outlet end 470 may be a separate component and may be inserted into a passage in the second housing 418. In such case, the outlet end 470 may be press fit, brazed, or otherwise attached to the second housing 418. To provide fluid communication between the outlet tube 462 and the second outlet 410, an opening 474 may be formed in the outlet end 470. The opening 474 may also provide communication with a housing passage 478 that may be formed in the second housing 418. In an embodiment, the opening 474 may have a diameter of between about 5.0 mm and about 10.0 mm. In other embodiments, the diameter of the opening 474 may be larger or smaller.

In any case, to ensure that air preferentially escapes from the second outlet 410, at least a portion of the second outlet 410 may have a diameter that is greater than that of the first outlet 408. In an embodiment, the diameter of the second outlet 410 may be between about 10 and 20 times larger than the diameter of the first outlet 208. For example, the second outlet 410 may be between about 5.0 mm and about 10.0 mm.

Improved systems for filtering particles in an airflow have now been provided. The filtering systems described above may be capable of removing more particles from an airflow than other conventional systems, with a minimal amount of air leakage from the system. The systems may achieve these improvements through the inclusion of a concentrator. In some embodiments, the improvements may be achieved through the inclusion of a particle separator. Although the above-described embodiments show the particle separator as being implemented in one embodiment, it may alternatively be included in both embodiments. Additionally, the filtering systems may be retrofitted into currently existing engines or aircraft.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A system for filtering particles from an airflow, comprising:
   a housing defining a chamber, the housing including an airflow and particle inlet, a first outlet, and a second outlet, the airflow and particle inlet adapted to direct at least a portion of the airflow and the particles into the chamber, the first outlet formed in the housing across the chamber from the airflow and particle inlet, the second outlet formed in the housing and located axially between the airflow and particle inlet and the first outlet;
   a tube disposed within the chamber and extending past the second outlet of the housing and including an inlet end hole and an outlet end hole, the inlet end hole aligned with the airflow and particle inlet of the housing; and
   a concentrator disposed between the outlet end hole of the tube and the first outlet of the housing and adapted to concentrate the particles from the airflow and particle inlet into a space within the chamber;
   wherein:
   the first outlet is adapted to allow the concentrated particles to exit the system; and
   the second outlet is located outside of the tube and is adapted to allow substantially all of the airflow to exit therethrough.

2. The system of claim 1, wherein the airflow and particle inlet is adapted to direct the airflow and the particles into a center of the chamber.

3. The system of claim 1, wherein the airflow and particle inlet comprises a particle accelerator adapted to accelerate a speed of the particles into the chamber.

4. The system of claim 1, wherein the concentrator is adapted to funnel the particles into the space within the chamber.

5. The system of claim 1, wherein the first outlet has a diameter and the second outlet has a diameter that is larger than the diameter of the first outlet.

6. The system of claim 1, wherein the second outlet further comprises a particle separator adapted to separate the airflow from the particles, to allow the particles to flow around the particle separator, and to allow the airflow to flow through the particle separator.

7. A system for filtering particles from an airflow, comprising:

a chamber;

an inlet tube extending through the chamber and having an inlet hole and an outlet hole through which the airflow and the particles flow into the chamber;

a funnel aligned with the outlet hole of the inlet tube to receive the particles therefrom and including a first outlet to provide an exit from the system for the particles; and a second outlet in flow communication with the chamber, the second outlet located axially outside of the inlet tube between the inlet hole and the outlet hole and adapted to allow substantially all of the airflow to exit therethrough.

8. The system of claim 7, wherein the inlet tube has a length and a decreasing cross-sectional flow area along the length.

9. The system of claim 7, wherein the outlet hole of the inlet tube and the first outlet are substantially aligned with each other.

10. The system of claim 7, wherein the outlet hole of the inlet tube and the first outlet are offset from each other by a distance.

11. The system of claim 7, wherein the first outlet has a diameter and the second outlet has a diameter that is greater than the diameter of the first outlet.

12. The system of claim 7, wherein the first outlet has a diameter and the second outlet has a diameter that is between twenty and twenty-five times greater than the diameter of the first outlet.

13. A system for filtering particles from an airflow, comprising:

a chamber having an inlet opening and a funnel, the inlet opening configured to allow the airflow and the particles to flow into the chamber, and the funnel adapted to receive the particles from the inlet opening;

a first outlet in flow communication with the funnel to provide an exit for the particles from the system;

an outlet tube disposed at least partially within the chamber having an inlet end and an outlet end, the inlet end including at least one aperture;

a shield disposed over the inlet end of the outlet tube and surrounding the at least one aperture; and a second outlet located outside of the outlet tube and between the inlet end and the outlet end of the outlet tube, the second outlet adapted to allow substantially all of the airflow to exit therethrough.

14. The system of claim 13, wherein the shield of the outlet tube has a flat surface, and the flat surface is substantially aligned with the chamber inlet opening.

15. The system of claim 13, wherein the shield of the outlet tube has a curved surface, and the curved surface is substantially aligned with the chamber inlet opening.

16. The system of claim 13, wherein the first outlet has a diameter and the second outlet has a diameter that is greater than the diameter of the first outlet.

17. The system of claim 13, wherein the first outlet has a diameter and the second outlet has a diameter that is between twenty and twenty-five times greater than the diameter of the first outlet.

18. The system of claim 13, wherein the first outlet is substantially aligned with the inlet opening.

* * * * *